United States Patent

Branton

[15] 3,700,197

[45] Oct. 24, 1972

[54] PIPE SUPPORTING MEANS

[72] Inventor: Eric Sidney Branton, Romford, England

[73] Assignee: Activated Sludge Limited, London, England

[22] Filed: Sept. 1, 1970

[21] Appl. No.: 68,608

[30] Foreign Application Priority Data

Sept. 30, 1969 Great Britain..........47,878/69

[52] U.S. Cl....................248/71, 248/74 B, 248/231
[51] Int. Cl..................................................F16l 3/14
[58] Field of Search.....248/49, 74 B, 74 PB, 71, 231; 24/280, 281, 282, 279

[56] References Cited

UNITED STATES PATENTS

| | | | |
|---|---|---|---|
| 1,373,045 | 3/1921 | Bernhard | 89/5 R |
| 1,588,350 | 6/1926 | Godwin | 248/71 |
| 1,602,503 | 10/1926 | Pleister | 248/71 X |
| 2,279,090 | 4/1942 | Markey | 248/74 B X |
| 2,684,222 | 7/1954 | Miller | 248/49 |
| 2,885,538 | 5/1959 | Mahon | 248/74 A X |
| 3,169,004 | 2/1965 | Rapata | 248/71 |
| 3,298,717 | 2/1967 | Rothwell | 24/279 X |

*Primary Examiner*—Chancellor E. Harris
*Attorney*—Berman, Davidson and Berman

[57] ABSTRACT

A supporting means for a pipe or pipework comprises a base part, a seating-part or saddle, for supporting a pipe, adjustably mounted on said base part so that the height or length of the supporting means can be varied, a strap or the like adapted to embrace or bear on said pipe to hold it onto the seating part or saddle and a screw threaded bolt for tightening said strap or the like about or against said pipe, said bolt having an anchoring arrangement which provides for alteration in the effective length of the bolt according to the adjustment of the seating-part or saddle on the base part. In one preferred embodiment of the invention the bolt has two, three or more head-like parts spaced along its length any one of which can be anchored to an anchorage on the base part, and the strap has a hooked part which hooks onto a hook-like member provided on the saddle.

6 Claims, 5 Drawing Figures

PATENTED OCT 24 1972

INVENTOR:
ERIC SYDNEY BRANTON
BY
Berman, Davidson & Berman

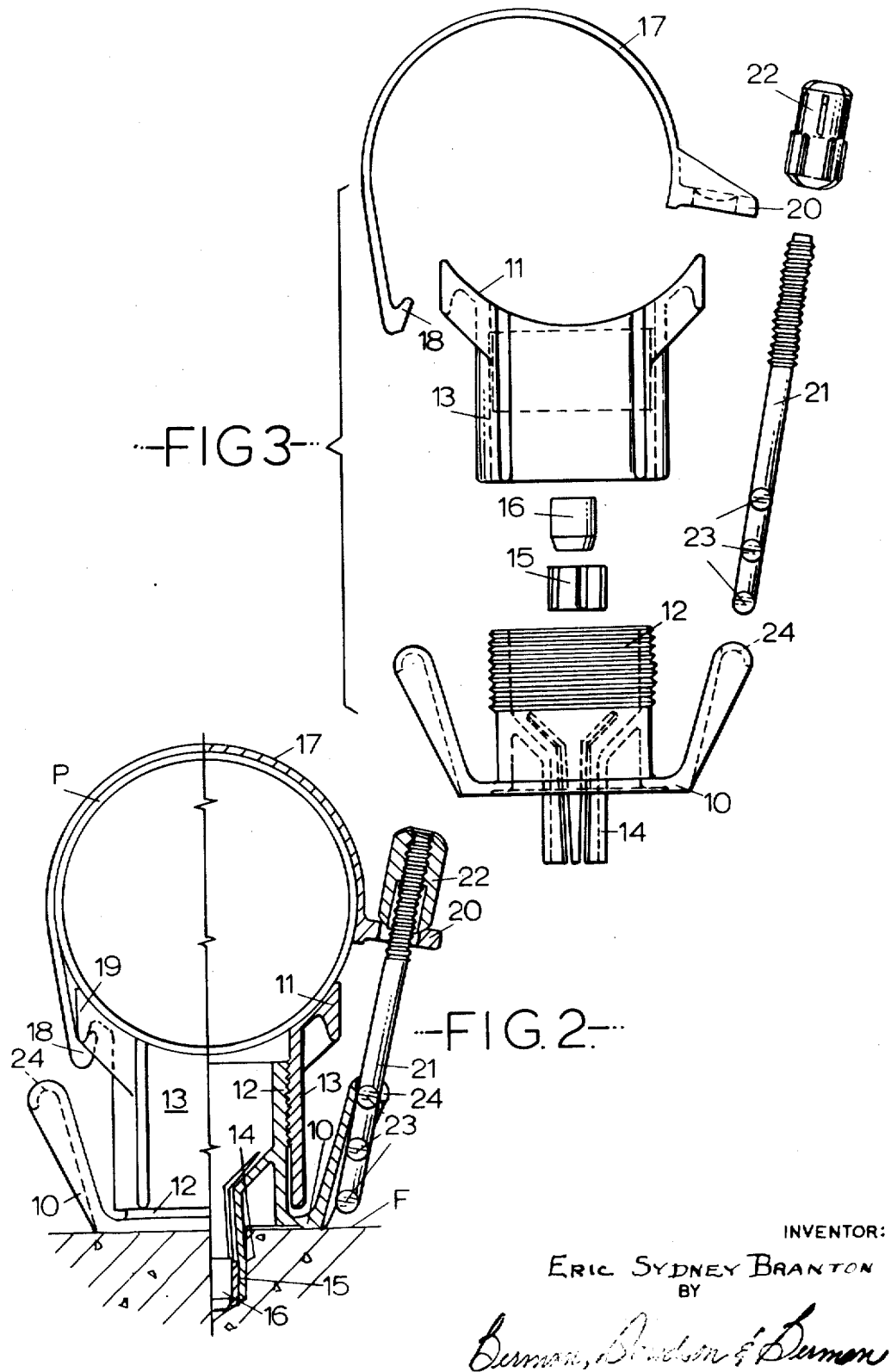

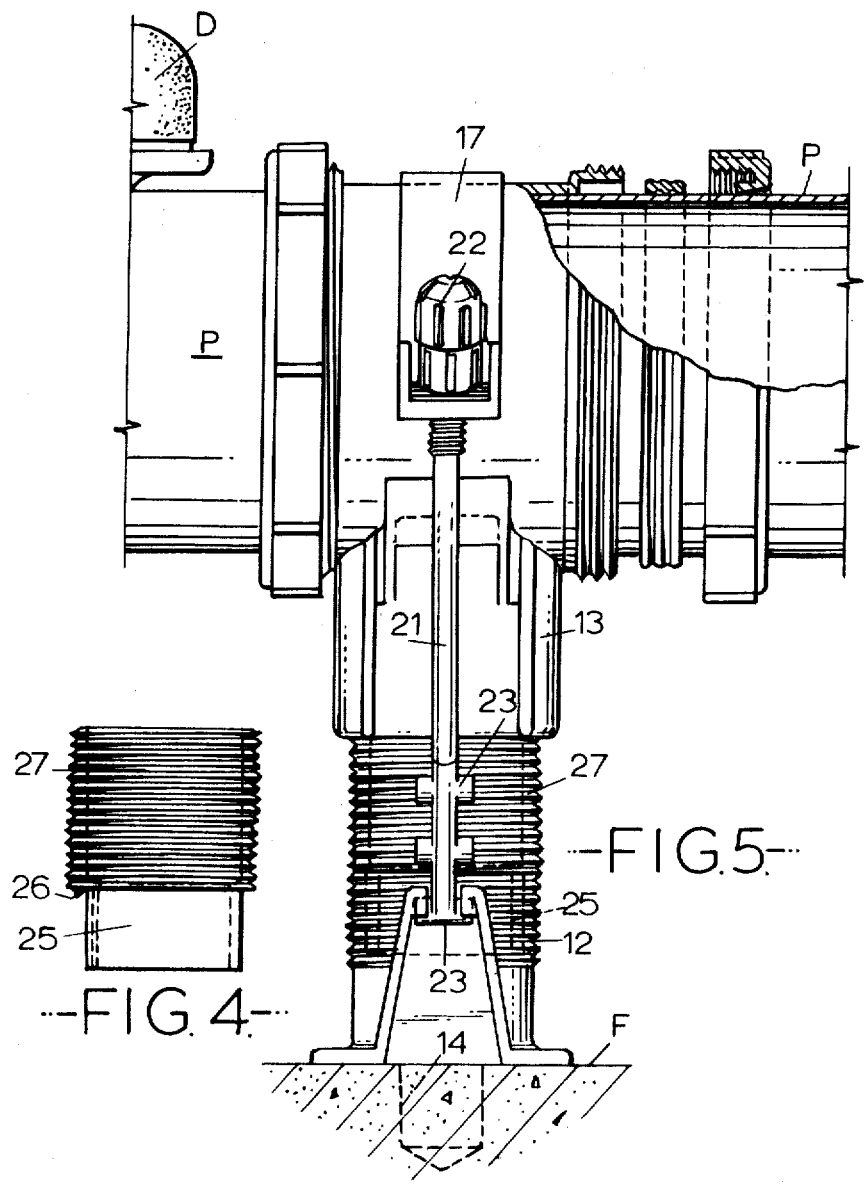

PIPE SUPPORTING MEANS

This invention is for improvements in or relating to supporting means for pipe or pipe work.

The invention is particularly, although not exclusively concerned with supporting means for the pipe work in a system for diffusing gases into liquid.

An example of such a system is that for diffusing air into sewage in the activated sludge process of sewage purification.

In one known arrangement for diffusing air into sewage, for the purification thereof by the activated sludge process, a plurality of inverted dish-shaped or dome-shaped diffusers having porous walls are mounted at spaced intervals on and along an air supply pipe or main, each diffuser being positioned over an orifice in said supply main so that it receives air therefrom. This air is diffused through the walls of the diffusers in the form of small bubbles into the sewage or other liquid to be treated, the supply main and the diffusers being located at, or towards the lower part of a treatment tank for the sewage or other liquid.

The use of an air supply pipe of plastics material (e.g. unplasticized polyvinyl chloride, hereinafter referred to as U.P.V.C.) instead of cast iron, has introduced a requirement for modifications in other components of the diffuser system and in particular a new means for supporting the air supply pipe or main from the floor or walls of the treatment tank so as to secure the pipe against floatation, side movement or depression and also provide for a range of adjustability of the distance between the pipe and the floor or wall of the treatment tank.

An object of the present invention is to meet this requirement.

According to the present invention there is provided a supporting means for a pipe or pipe-work comprising a base-part, a seating-part or saddle, for supporting a pipe, adjustably mounted on said base-part so that the height or length of the supporting means can be varied and a holding device for holding the pipe on said seating-part or saddle, said device including a part which is adjustable to compensate for adjustment of the seating-part or saddle on the base part.

According to a further feature of the invention there is provided a supporting means for a pipe or pipe-work comprising a base-part, a seating-part or saddle, for supporting a pipe, adjustably mounted on said base-part so that the height or length of the supporting means can be varied, a strap or the like adapted to embrace or bear on said pipe to hold it to the seating-part or saddle, and a bolt (e.g. a screw-threaded bolt) or the like for tightening said strap or the like about or against said pipe, said bolt having an anchoring arrangement which provides for alteration in the effective length of the bolt according to the adjustment of the seating-part or saddle on the base-part.

Conveniently, one end of the strap has a hooked part which hooks onto a hook-like member on the saddle and the bolt has two, three or more abutments or "heads" spaced along its length and adapted to be engaged selectively with an anchorage provided on or adjacent the base part.

In one preferred embodiment of the invention the saddle has a screw-threaded socket part which screws onto a spigot of the base part or vice versa.

One particular embodiment of the invention will now be described, by way of example, with reference to the accompanying drawing in which:

FIG. 2 is a half end view and half cross-section on the line II—II of FIG. 1,

FIG. 3 is an exploded view of the parts which go to make up the pipe supporting means shown in FIGS. 1 and 2, FIG. 4 shows an extension piece or "lift" for the base unit, and FIG. 5 is a side elevation showing how the extension piece is fitted.

Figure 1:
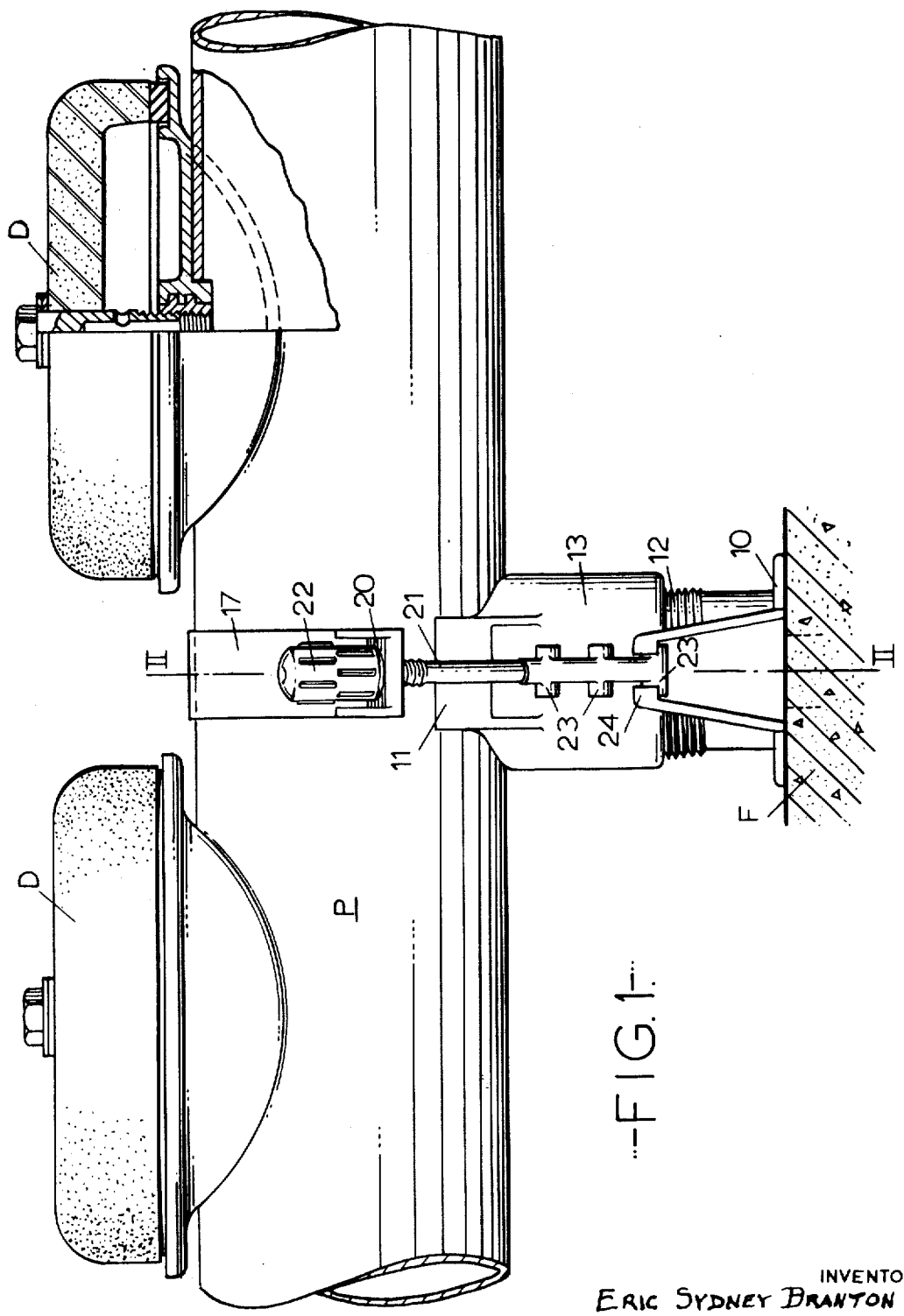
FIG. 1 is a side elevation of a part of an air diffuser system.

The supporting means shown on the drawing comprises a base unit 10 and a saddle 11 for the pipe P.

The base unit has a tubular spigot part 12 which is screw-threaded externally, the saddle having a tubular socket part 13 which is screw-threaded internally so as to screw onto the spigot part 12 of the base unit. By this arrangement the height of the saddle, in relation to the floor F, can be adjusted from a minimum as shown in FIG. 2 to a maximum as shown in FIG. 1.

The base unit 10 is secured in the floor or foundation F by means of a base anchor 14 formed integrally with the spigot 12 and somewhat like a split collet. A central sleeve or collar 15 which is preferably a splined collar is inserted in the tubular base anchor 14. By driving a locking plug 16 into the collar 15 it, and the base anchor 14, are expanded into firm engagement with the concrete or like floor or foundation F which it may be assumed is the floor of a sewage treatment or like tank.

The pipe P, on which the porous diffuser D is mounted, in known manner, so as to receive air from the pipe, is held firmly on the saddle 11 by means of a strap 17. One end of the strap is formed with a hook 18 which engages with a hook-like part 19 formed on the underside of the saddle 11. The opposite end of the strap is formed with an apertured lug 20 through which passes a bolt 21 provided with a nut 22. Towards the end of the bolt 21, remote from the nut 22, it is provided with a series of spaced abutments or "heads" 23 adapted to engage selectively with a hook-like anchorage 24 provided on the base unit 10.

By selecting an appropriate abutment or head 23 on the bolt 20 and engaging it with the anchorage 24, according to the selected height of the saddle 11, and tightening the nut 22, the pipe is firmly held down onto the saddle.

If a particularly high saddle is required the extension piece or "lift" shown in FIG. 4 is used. This extension piece has a tubular spigot part 25, a shoulder 26 and a screw threaded part 27. The spigot part 25 fits into the upper end of the tubular spigot part 12 of the base unit 10, the shoulder 26 bearing on the upper edge of the spigot part 12 as shown in FIG. 5. The tubular socket 13, of the saddle, is then screwed onto the screw threaded part 27 of the extension piece.

I claim:

1. A supporting means for a pipe comprising a base-part having a screw threaded portion, a saddle, for supporting a pipe, having a complementary screw threaded portion screwed onto said screw threaded portion of the base-part whereby the distance between the base-part and the saddle may be adjusted and thereby the height or length of the supporting means, a first anchorage on the base part and a second anchorage on the saddle, a bolt having a plurality of heads along its shank one of which is engaged with said first anchorage, a pipe-embracing-strap having one of its ends engaged with said second anchorage and a hole in its other end positioned on the shank of said bolt, and a nut screwed on to said bolt over said other end of the strap thereon and operative to tighten said strap about a pipe on the saddle.

2. A supporting means as claimed in claim 1 wherein said second anchorage on the saddle is hook-like and the strap has a hooked part on said one of its ends which hooks onto said second anchorage.

3. A supporting means as claimed in claim 1 wherein the base-part has an expandable base-anchor for securing it to a foundation.

4. A support as claimed in claim 1 wherein said first anchorage on the base-part is a hook-like anchorage for engaging any one of said heads of the bolt.

5. A support as claimed in claim 1 wherein there is an extension piece, for increasing the height or length of the supporting means, which mates with and is positioned between the base part and the saddle.

6. A support as claimed in claim 1 wherein said first and second anchorages each comprise a pair of parts positioned diametrically opposite one another on the base part and saddle respectively, whereby said strap and bolt may be secured over a pipe on the saddle in reversed positions.

* * * * *